United States Patent
Chavan et al.

(10) Patent No.: US 6,793,389 B2
(45) Date of Patent: Sep. 21, 2004

(54) MONOLITHICALLY-INTEGRATED INFRARED SENSOR

(75) Inventors: Abhijeet V. Chavan, Carmel, IN (US);
James H. Logsdon, Kokomo, IN (US);
Dan W. Chilcott, Greentown, IN (US);
Han-Sheng S. Lee, Bloomfield Hills, MI (US); David K. Lambert, Sterling Heights, MI (US); Timothy A. Vas, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 202 days.

(21) Appl. No.: 10/065,447

(22) Filed: Oct. 18, 2002

(65) Prior Publication Data
US 2003/0147449 A1 Aug. 7, 2003

Related U.S. Application Data
(60) Provisional application No. 60/354,590, filed on Feb. 4, 2002.

(51) Int. Cl.[7] .............................. G01K 7/02; G01J 5/12; H01L 35/00
(52) U.S. Cl. ....................... 374/179; 374/163; 374/183; 374/121; 136/213
(58) Field of Search ................................. 374/163, 137, 374/179, 183, 1, 120–121; 250/338.1; 136/330, 224, 213

(56) References Cited

U.S. PATENT DOCUMENTS

| | | | | |
|---|---|---|---|---|
| 5,059,543 A | | 10/1991 | Wise et al. ..................... 437/3 |
| 5,369,280 A | * | 11/1994 | Liddiard ................ 250/370.08 |
| 5,446,437 A | * | 8/1995 | Bantien et al. ................ 338/25 |
| 5,600,174 A | * | 2/1997 | Reay et al. .................. 257/467 |
| 5,602,393 A | * | 2/1997 | Gerard ..................... 250/338.4 |
| 5,689,087 A | | 11/1997 | Jack ............................ 136/213 |
| 5,746,930 A | * | 5/1998 | Belcher et al. ................ 216/87 |
| 5,801,070 A | * | 9/1998 | Zanini-Fisher et al. ........ 438/54 |
| 5,982,014 A | | 11/1999 | Paige .......................... 257/467 |
| 5,994,188 A | | 11/1999 | Disney |
| 6,079,873 A | * | 6/2000 | Cavicchi et al. ............... 374/10 |
| 6,127,701 A | | 10/2000 | Disney |
| 6,194,722 B1 | * | 2/2001 | Fiorini et al. ............. 250/338.1 |
| 6,300,632 B1 | * | 10/2001 | Liu et al. .................. 250/338.4 |
| 6,329,587 B1 | * | 12/2001 | Shoga ......................... 136/202 |
| 6,335,478 B1 | * | 1/2002 | Chou et al. .................. 136/201 |
| 6,355,939 B1 | * | 3/2002 | Dodd ........................... 257/21 |
| 6,359,276 B1 | * | 3/2002 | Tu .......................... 250/338.1 |
| 6,369,646 B1 | | 4/2002 | Kesler et al. |
| 6,429,428 B1 | * | 8/2002 | Parsons et al. .......... 250/338.2 |
| 2002/0130263 A1 | * | 9/2002 | Kwakudo et al. ........ 250/338.2 |

* cited by examiner

*Primary Examiner*—Gail Verbasky
(74) *Attorney, Agent, or Firm*—Stefan V. Chmielewski

(57) ABSTRACT

An integrated sensor comprising a thermopile transducer and signal processing circuitry that are combined on a single semiconductor substrate, such that the transducer output signal is sampled in close vicinity by the processing circuitry. The sensor comprises a frame formed of a semiconductor material that is not heavily doped, and with which a diaphragm is supported. The diaphragm has a first surface for receiving thermal (e.g., infrared) radiation, and comprises multiple layers that include a sensing layer containing at least a pair of interlaced thermopiles. Each thermopile comprises a sequence of thermocouples, each thermocouple comprising dissimilar electrically-resistive materials that define hot junctions located on the diaphragm and cold junctions located on the frame. The signal processing circuitry is located on the frame and electrically interconnected with the thermopiles. The thermopiles are interlaced so that the output of one of the thermopiles increases with increasing temperature difference between the hot and cold junctions thereof, while the output of the second thermopile decreases with increasing temperature difference between its hot and cold junctions.

22 Claims, 4 Drawing Sheets

MONOLITHICALLY-INTEGRATED INFRARED SENSOR

CROSS REFERENCE TO RELATED APPLICATIONS

This application claims the benefit of U.S. Provisional Application No. 60/354,590, filed Feb. 4, 2002.

BACKGROUND OF INVENTION

1. Field of the Invention

The present invention generally relates to thermopile-based thermal sensors. More particularly, this invention relates to a monolithically-integrated infrared sensor in which a transducer and its sensing circuit are combined on a single silicon substrate in a manner that enhances and protects the transducer output signal and reduces noise.

2. Description of the Related Art

A thermopile comprises a series of connected thermocouples, each made up of dissimilar electrically-resistive materials such as semiconductors and metals, and converts thermal energy into an electric voltage by a mechanism known as the Seebeck effect. As an example, U.S. Pat. No. 5,982,014 describes a microfabricated differential temperature sensor comprising multiple stacked thermopiles. The general structure and operational aspects of thermopiles are well known and therefore will not be discussed in any detail here.

Infrared sensors that make use of thermopiles are also known, as evidenced by U.S. Pat. No. 5,059,543 to Wise et al., which describes a thermopile-based infrared sensor comprising a thermopile fabricated on a single silicon substrate. Cold junctions are located on a rim that supports and surrounds a diaphragm. The hot junctions of the thermopile are located at the center of the diaphragm, where exposure to infrared radiation occurs. A shortcoming of the sensor structure and process disclosed by Wise et al. is the manner in which the rim and diaphragm are defined. According to one embodiment, the rim is heavily doped for the purpose of serving as an etch stop during a wet chemical etch used to define the rim and diaphragm, thereby providing front-to-back alignment. The high dopant concentration and thermal treatment required for the rim to perform as an etch stop is incompatible with standard CMOS devices, necessitating that the sensor must be fabricated on a separate chip from its signal processing circuitry. This aspect of Wise et al. is disadvantageous because signal noise increases with increasing distance that a signal must travel to its processing circuitry. Voltages generated by the Seebeck effect are very small (in microvolts) and thus very difficult to detect with typical methods. While the voltage output of a thermopile can be increased with increasing numbers of thermocouples, the series resistance of the thermopile also increases. The resulting high impedance transducer output is particularly susceptible to the external noise that would be associated with the device of Wise et al.

U.S. Pat. No. 5,689,087 to Jack describes a thermopile-based radiation sensor that may include support circuitry integrated on the same substrate as the sensor. However, shortcomings or disadvantages of jack's device include the requirement for using materials and process steps that are not standard in a CMOS high volume IC fabrication process and thus are not conducive to mass production processes. Finally, an article authored by Müller et al., entitled A Thermoelectric Infrared Radiation Sensor with Monolithically Integrated Amplifier Stage and Temperature Sensor, Sensors and Actuators, A 54 (1996) 601–605, discloses a single thermopile infrared sensor that makes use of SIMOX (separation by implanted oxygen) technology to form an etch stop for etching. Müller et al. (and the previously reported art) do not provide any on-chip calibration capability that enables calibration after packaging to allow for compensation variations that may occur in the packaging process.

SUMMARY OF INVENTION

The present invention is an integrated sensor comprising a thermopile transducer and signal processing circuit that are combined on a single semiconductor substrate, such that the transducer output signal is sampled in close proximity by the processing circuit. The transducer is adapted for sensing infrared radiation, and the sensor preferably includes features that promote absorption of thermal radiation within a portion of the sensor structure.

Generally, the sensor comprises a frame formed of a semiconductor material that is not heavily doped, and with which a diaphragm is supported for receiving thermal radiation. The diaphragm comprises multiple layers that include a first dielectric layer, a sensing layer containing at least a pair of interlaced thermopiles, a second dielectric layer, and a first metal layer defining metal conductors that electrically contact the thermopiles through openings in the second dielectric layer. Each thermopile comprises a sequence of thermocouples, each thermocouple comprising dissimilar electrically-resistive materials that define hot junctions located on the diaphragm and cold junctions located on the frame. Finally, the sensor includes signal processing circuitry on the frame and electrically interconnected with the thermopiles through the metal conductors defined by the first metal layer. The thermopiles are interlaced so that the output of a first of the thermopiles increases with increasing temperature difference between the hot and cold junctions thereof, and so that the output of a second of the thermopiles decreases with increasing temperature difference between the hot and cold junctions thereof. As a result, the transducer produces a differential signal output that converts a substantial portion of the noise into common mode noise that can be filtered out, thereby increasing the resolution of the sensor.

As described above, signal noise is minimized because the transducer and its signal processing circuitry are fabricated on the same chip, thereby minimizing the distance that the unamplified transducer signal must be transmitted. In particular, the close proximity between the transducer and the signal processing circuitry, together with the use of symmetry, are used to minimize capacitive and inductive coupling to off-chip sources of electric and magnetic fields that would be potential sources of extraneous signals. Fabrication of the sensor structure does not require high dopant concentrations or thermal treatments that are incompatible with standard CMOS devices, such that the signal processing circuitry can make use of CMOS and BiCMOS technology. The sensor also does not require the use of materials and process steps that are not conducive to mass production processes made possible with CMOS and micromachining technology.

Other objects and advantages of this invention will be better appreciated from the following detailed description.

DETAILED DESCRIPTION

Figure 1:
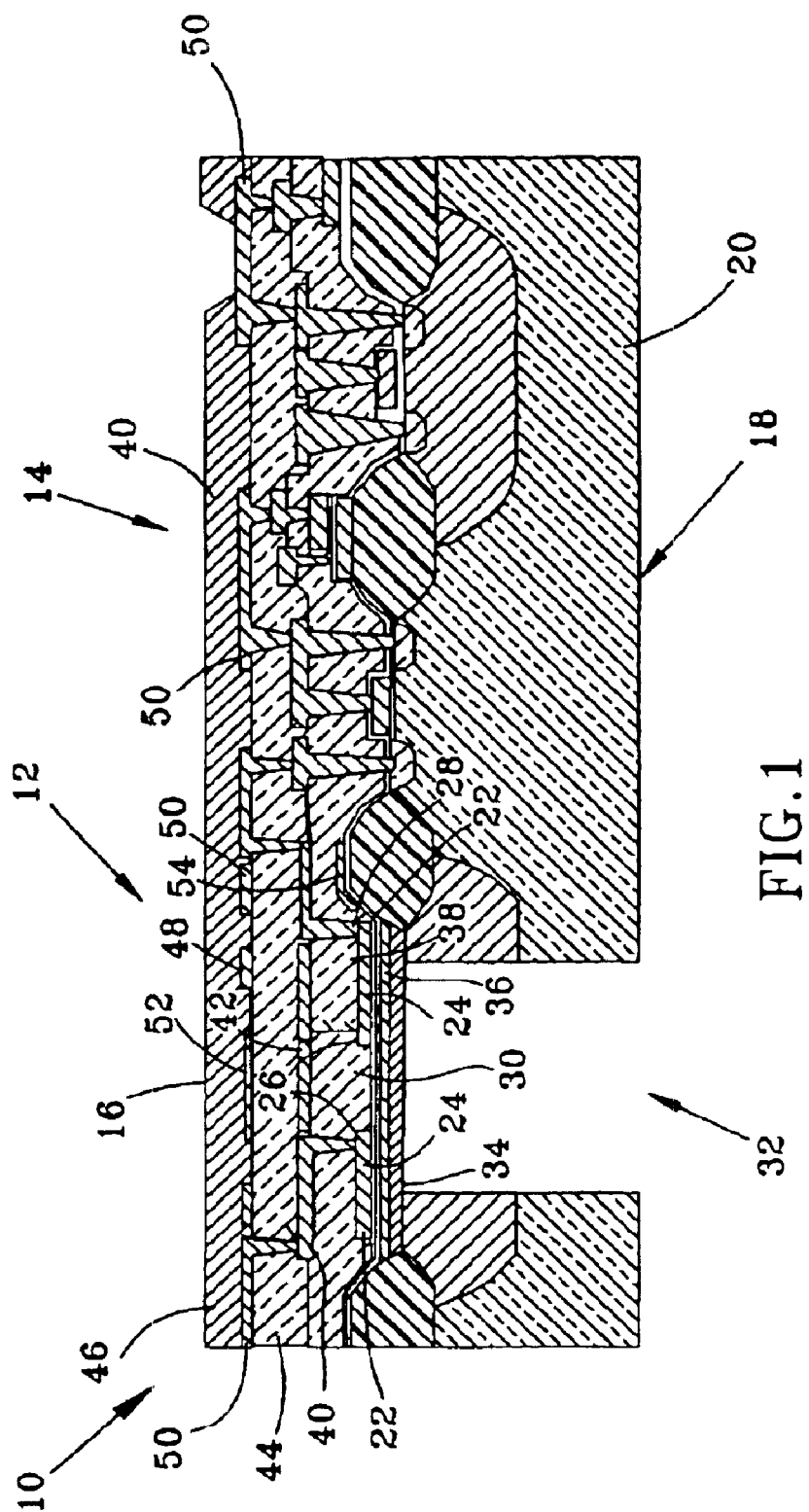
FIG. 1 represents a cross-section of a thermal sensor comprising a thermopile transducer and signal conditioning circuitry in accordance with a preferred embodiment of the invention.

With reference to the Figures, and particularly FIG. 1, an infrared sensor 10 is shown comprising a thermopile transducer 12 and signal processing circuitry 14, both of which are fabricated on a single semiconductor substrate 20 that may be formed of single-crystal silicon or another suitable semiconductor material. The thermopile transducer 12 is supported on a thin dielectric membrane, or diaphragm 16, which is surrounded by an undoped or lightly-doped (i.e., not heavily doped) support frame 18. Both the diaphragm 16 and its support frame 18 are defined by etching the backside of the substrate 20 to form a cavity 32. The signal conditioning circuitry 14 is represented as comprising complementary metal-oxide-semiconductor (CMOS) and bipolar devices fabricated on the frame 18 to provide on-chip interface/compensation circuitry for the output of the transducer 12. Notably, the substrate 20 is undoped or lightly-doped because a heavily-doped substrate would be incompatible with the CMOS process used in the present invention.

The diaphragm 16 and frame 18 support at least two interlaced thermopiles 22. In FIG. 1, the thermopiles 22 are shown supported with a pair of dielectric layers, one of which is preferably a thermal oxide layer 34 while the second is preferably a nitride film 36 formed by low-pressure chemical vapor deposition (LPCVD). The thermal oxide layer 34 can be grown during n-well drive-in during a standard CMOS process to have a thickness of approximately 0.3 micrometer, which is sufficiently thick to serve as an etch-stop when etching the substrate 20 to form a cavity 32 that delineates the multilayered diaphragm 16. The nitride film 36 is approximately 0.2 to 0.4 micrometer thick, and is deposited and patterned after growing the thermal oxide layer 34. The nitride film 36 is preferably in tension to convert to tensile the net stress in the multilayer diaphragm 16, as discussed in co-pending U.S. patent application Ser. No. 10/065,448, which discloses a suitable process for fabricating the sensor 10, and whose content is therefore incorporated herein by reference.

Figure 2:
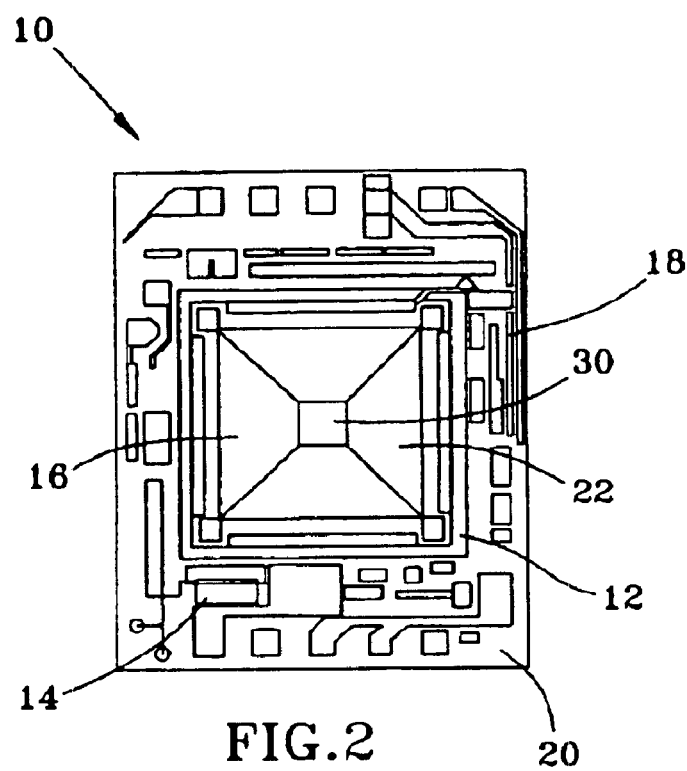
FIG. 2 is a scanned image showing a plan view of the sensor represented in FIG. 1.
Figure 5:
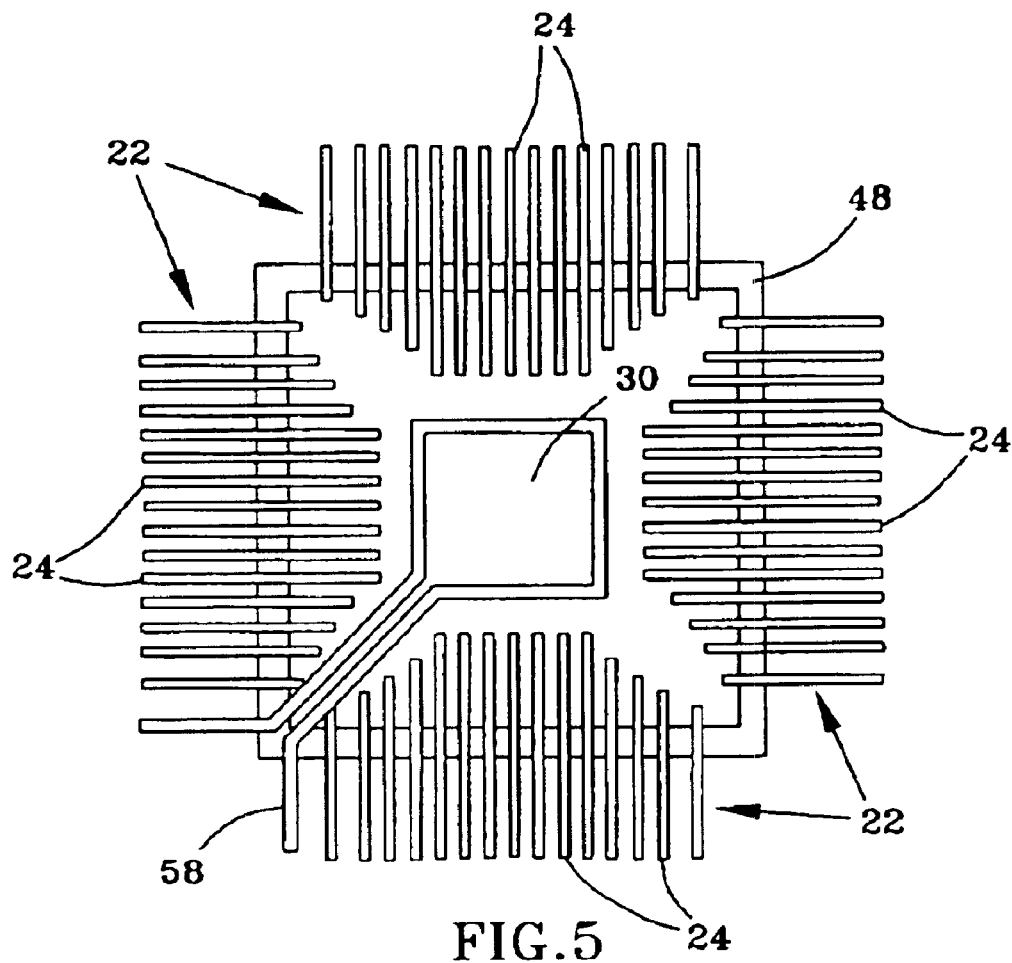
FIG. 5 represents the alignment of a heat equalization metal rim with respect to thermocouples of the thermopiles, by which the rim is over and surrounds hot junctions of the thermopiles.

Each thermopile 22 comprises a sequence of thermocouples 24, with the thermocouples 24 of one thermopile 22 alternating with the thermocouples 24 of the second thermopile 22, hence the description of the thermopiles 22 being interlaced. Each thermocouple 24 has a pair of junctions, referred to as hot and cold junctions 26 and 28, respectively, formed by dissimilar electrically-resistive materials. The dissimilar materials are preferably p or ntype polysilicon and aluminum, though other materials could be used, including p-type with ntype polysilicon. As seen in FIGS. 2 and 5, the diaphragm 16 has a rectangular (square) shape, and the thermocouples 24 are shortest at the corners of the diaphragm 16 and progressively increase in length therebetween. In this manner, the thermocouples 24 are arranged to define a pyramidal shape in the plane of the diaphragm 16, such that essentially the entire diaphragm 16 is occupied by either the thermopiles 22 or a central heat-absorption zone 30 surrounded by the thermopiles 22. The thermocouples 24 have their cold junctions (CJ) 28 on the frame 18 and their hot junctions (HJ) 26 on the diaphragm 16, whose upper surface is adapted for exposure to infrared radiation. When the hot junction 26 of each thermocouple 24 is subjected to a higher temperature than the cold junction 28 as a result of infrared radiation, the thermocouples 24 produce a measurable output voltage.

FIG. 5 represents a preferred aspect of the present invention, in which the sensor 10 has a heater element 58 that surrounds the central heat-absorption zone 30. The heater element 58 can be formed of polysilicon, such as with and in the plane of a polysilicon (Poly-1) layer 54 discussed below in reference to FIG. 1. The signal conditioning circuitry 14 can be used to switch a current to the heater element 58, thereby raising the temperature of the central heat-absorption zone 30 of the diaphragm 16. This capability can be used as a self-test mechanism to determine if the transducer 12 is functioning properly after packaging and installation in the field. By switching two different currents into the transducer 12, it is possible to obtain a change in output voltage proportional to the difference in the currents, or equivalently the generated heat in the diaphragm 16.

Contact is made to the hot and cold junctions 26 and 28 through vias defined in a dielectric layer 38 and a metallization layer 40 (Metal-1) that can be deposited and patterned to also define the metallization for the circuitry 14. The metallization layer 40 can be formed of, for example, Al-1% Si or another suitable metallization alloy, and have a thickness of, for example, about 6000 Angstroms. The dielectric layer 38 may comprise a layer of phosphosilicate glass (PSG) or low temperature oxide (LTO) (at thicknesses of, for example, about 3000 Angstroms). The dielectric layer 38 also preferably includes a layer of spin-on glass (SOG) (e.g., about 800 Angstroms) for planarizing.

In addition to those materials discussed above, the diaphragm 16 preferably comprises additional layers of multiple different materials to enhance infrared absorption and heat generation. In particular, the central heat-absorption zone 30 preferably contains layers of dielectric materials and metals that enhance infrared and heat absorption in the vicinity of the hot junctions 26. FIG. 1 shows an absorber/reflector metal 42 within the central heat-absorption zone 30 and located below two dielectric layers 44 and 46, at least one of which is formed of an infrared absorption dielectric material such as oxynitride or a tetra-ethyl-ortho-silicate (TEOS)-based oxide. In a preferred embodiment, the uppermost layer 46 is formed of oxynitride (a suitable thickness being about 10,000 to about 28,000 Angstroms), and the underlying dielectric layer 44 is a TEOS-based oxide (a suitable thickness being about 16,000 Angstroms). The oxynitride layer 46 is desirable as the outer layer of the diaphragm 16 because, similar to the LPCVD nitride film 36, oxynitride contributes to the creation of a tensile net stress within the diaphragm 16, again as discussed in co-pending U.S. patent application Ser. No. 10/065,448.

The absorber/reflector metal 42 is preferably deposited and patterned with the metallization layer 40 (Metal-1), and therefore is also formed of Al-1% Si or another suitable metallization alloy. Alternatively, the absorber/reflector metal 42 could be deposited and patterned separately from the metallization layer 40, which would permit the metal 42 to be formed of other suitable materials. The absorber/reflector metal 42 serves to reflect any unabsorbed radiation (i.e., traveling downward toward the cavity 32) back toward the infrared absorbing dielectric layers 44 and 46. The absorber/reflector metal 42 also sets up a standing wave of infrared electromagnetic radiation inside the dielectric layers 44 and 46. The standing wave has a node at the surface of absorber/reflector metal 42, where the intensity is approximately zero. The incident and reflected beams interfere constructively at approximately one-quarter wavelength (in the dielectric) above the surface of the metal 42. A second node occurs at approximately one-half wavelength (in the dielectric) above the surface of the metal 42. Similarly, if the diaphragm 16 is thick enough, there will be a second maximum where the beams interfere constructively about three-quarters wavelength (in the dielectric) above the surface of the metal 42. The effect of the standing waves inside the dielectric layers 44 and 46 needs to be taken into account if infrared absorption is to be predicted accurately, but to first approximation, if the layer is at least one-quarter wavelength thick, the total absorption inside the dielectric layers 44 and 46 is approximately the same as if the diaphragm 16 was twice as thick and the metal 42 was missing.

This method of dual absorption in the central heat-absorption zone 30 raises its temperature above that of the surrounding area of the diaphragm 16, on which infrared radiation may also be incident. This, coupled with the heat loss that occurs at the support frame 18, creates a temperature gradient from the center of the sensor 10 to the edge of the diaphragm 16 that generates the Seebeck potential in the thermopiles 22. The combination of the absorber/reflector metal 42 below infrared absorbing dielectric layers 44 and 46 formed of oxynitride and a TEOS-based oxide provide good absorption (greater than 50%) of radiation of wavelengths of about eight to about fifteen micrometers, and good transmission (greater than 80%) for other wavelengths, creating what can be termed a thermal filter whereby heating of the diaphragm 16 can be proportional to a first order to the absorbed wavelengths only.

As shown in FIGS. 1 and 5, the sensor 10 also preferably has a heat equalization rim 48, which as shown can be deposited and patterned with a second metallization layer 50 (Metal-2) that interconnects the metallization layer 40 with the signal processing circuitry 14. The rim 48 is preferably patterned so that, in terms of alignment in the direction of radiation transmission through the diaphragm 16, the rim 48 surrounds the hot junctions 26 of the thermopiles 22. In this manner, the rim 48 promotes equalization of the temperature at the inside edge of the rim 48, which is accurately patterned, to the temperature of the support frame 18, instead of relying on the actual position of the perimeter of the diaphragm 16. The overall effect is to reduce the amount of temperature variation from one hot junction 26 to another, and from one cold junction 28 to another. The rim 48 thus promotes consistent behavior of the thermopiles 22 irrespective of any etching variations that might be introduced by the fabrication process, during which the backside of the substrate 20 is etched to define the diaphragm 16 and cavity 32.

FIG. 1 shows yet another metal body in the form of a patterned tungsten silicide (W—Si) layer 52, which is embedded in the diaphragm 16 to increase infrared absorption within the central heat-absorption zone 30. The W—Si layer 52 is shown as being deposited and patterned so as to be directly above the absorber/reflector metal 42 and in the same plane as the heat equalization rim 48 between the pair of dielectric layers 44 and 46. The W—Si layer 52 is able to increase thermal absorption within the central heat-absorption zone 30 as a result of being a localized source of infrared absorption at a peak in the standing wave pattern inside the dielectric layers 44 and 46. The W—Si layer 52 approximates the idealized structure of a thin resistive layer with sheet resistance of about 188 ohm/square sandwiched between two dielectric layers 44 and 46, each of about one-quarter wavelength thickness, contacted on the back by the absorber/reflector metal 42, which is theoretically predicted to give more than 96% absorption for the entire 7 to 14 micron band of infrared wavelength. A preferred thickness for the W—Si layer 52 is less than 400 Angstroms.

Figure 6:
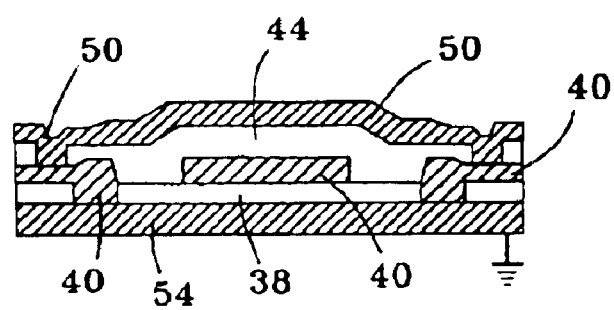
FIG. 6 represents a cross-section of the thermal sensor of FIG. 1, modified to show a coaxial connection path formed by metallization and a polysilicon layer between the thermopile transducer and its signal conditioning circuitry in accordance with a preferred aspect of the invention.

According to a preferred aspect of the invention, the thermopiles 22 are interlaced and the order of their thermocouple materials are reversed between adjacent thermocouples 24, so the output potential of one thermopile 22 increases directly proportional to an increase in temperature at its hot junctions 26, and the output potential of the other thermopile 22 decreases in proportion to an increase in temperature at its hot junctions 26. The two resulting potentials are then conducted by the metallization layers 40 and 50 to the signal processing circuitry 14, operating as a sensitive impedance converter circuit. This dual signal approach, or differential sensing, allows rejection of common-mode noise, thereby increasing the resolution of the sensor 10. In the BiCMOS process of this invention, the signals from the thermopiles 22 are preferably transferred to the circuitry 14 utilizing coaxial connection paths formed by the second metallization layer 50 and the aforementioned polysilicon layer 54 connected to ground potential, as depicted in FIG. 6.

Figure 4:
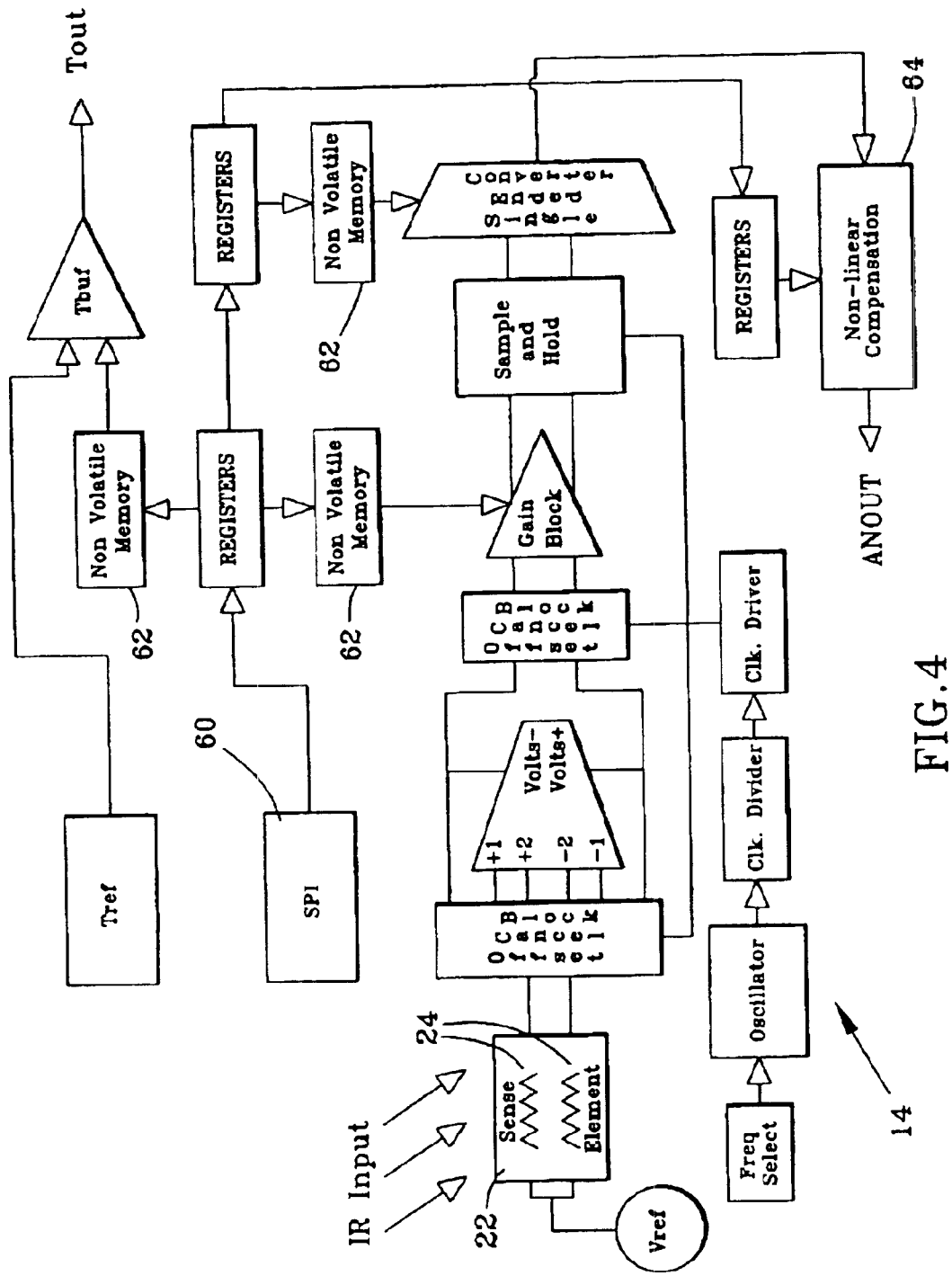
FIG. 4 shows a system diagram of the signal conditioning circuitry of the sensor.

As seen in FIG. 1, the signal processing circuitry 14 for the thermopile transducer 12 is located on the support frame 18 where the cold junctions 28 of the thermopiles 22 are located. The circuitry 14 preferably comprises a four-stage signal processing path that includes noise reduction mechanisms and filtering, as schematically represented in FIG. 4. The circuitry 14 provides a gain to the incoming signal and also converts it into a single-ended analog and/or digital output. Because an important factor to accurate measurement of sensor output is knowledge of the substrate temperature, the temperature of the substrate 20 is preferably measured directly with an on-chip PTAT (proportional-to-absolute temperature) output voltage, indicated as Tref in FIG. 4. Importantly, the circuit diagram of FIG. 4 also shows the signal processing circuitry 14 as providing an on-chip calibration capability with a serial peripheral interface (SPI) 60 and EPROM (electrically programmable read only memory) 62, and nonlinear compensation 64 that provides nonlinear temperature compensation responsive to changes in the operating temperature of the circuitry 14. With the on-chip calibration capability, the sensor 10 can be calibrated after packaging, thereby allowing compensation for essentially all variations that may occur during the packaging process. The nonlinear compensation 64 is preferably in accordance with commonly-assigned U.S. patent application Ser. No. 10/075,130, incorporated herein by reference.

Figure 3:
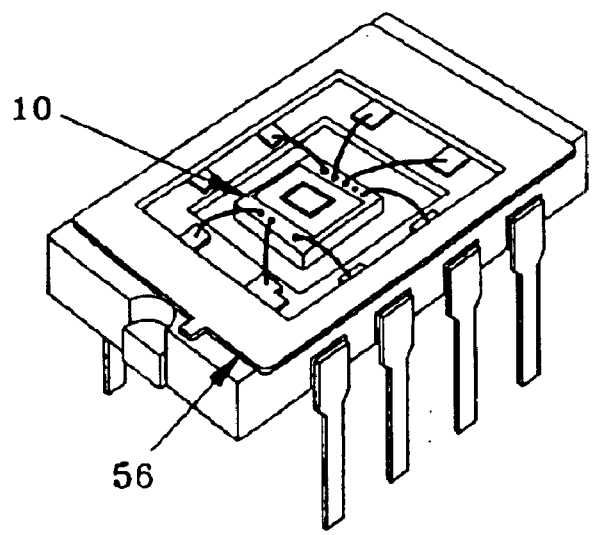
FIG. 3 is a perspective view of the sensor of FIG. 2 packaged in a CERDIP package.

The sensor 10 can be mounted in industry standard metal or ceramic IC packages. Preferred packaging has the capability to enhance sensor performance and reduce cost. Traditionally, infrared sensors have been packaged in metal-can TOx packages which are vacuum sealed and equipped with an optical lens or window to allow infrared radiation to pass therethrough to the sensor. These packages can be expensive and difficult to manufacture. With the present invention, the sensor 10 can be mounted in a standard CERDIP (CERamic Dual In-line Package) 56, as represented in FIG. 3, or another ceramic cavity packaging arrangement. Tooling can be employed to achieve deeper cavities and/or multiple cavities in the same package 56. An optical window and lens (not shown) can be provided in the package cap to permit efficient transmission of infrared radiation to the diaphragm 16 of the sensor 16. The optical window can also form the sealing ring between the frame and cap of the package 56. The package 56 is preferably sealed in vacuum, preferably using a fluxless solder process or glass frit.

While the invention has been described in terms of a preferred embodiment, it is apparent that other forms could be adopted by one skilled in the art. For example, the sensor 10 could differ in appearance and construction from the embodiment shown in the Figures, and appropriate materials could be substituted for those noted. Accordingly, the scope of the invention is to be limited only by the following claims.

What is claimed is:

1. An infrared sensor comprising:
   a frame formed of a semiconductor material that is not heavily doped;
   a diaphragm having a perimeter supported by the frame, the diaphragm having a first surface for receiving thermal radiation and an oppositely-disposed second surface, the diaphragm comprising multiple layers including a first dielectric layer, a sensing layer that contains at least a pair of interlaced thermopiles, a second dielectric layer, and a first metal layer defining metal conductors that electrically contact the thermopiles through openings in the second dielectric layer, each thermopile comprising a sequence of thermocouples, each thermocouple comprising dissimilar electrically-resistive materials that define hot junctions located on the diaphragm and cold junctions located on the frame; and
   signal processing circuitry on the frame and electrically interconnected with the thermopiles through the metal conductors defined by the first metal layer, the thermopiles being interlaced so that the output of a first of the thermopiles increases with increasing temperature difference between the hot and cold junctions thereof, and so that the output of a second of the thermopiles decreases with increasing temperature difference between the hot and cold junctions thereof.

2. The infrared sensor according to claim 1, further comprising a metal body within the diaphragm for reflecting infrared radiation through the second dielectric layer so as to increase absorption of infrared radiation and thereby increase the temperature at the hot junctions of the thermopiles.

3. The infrared sensor according to claim 1, further comprising a metal body within the diaphragm, surrounding the hot junctions of the thermopiles, and between the hot and cold junctions of the thermopiles, the metal body serving to promote equalization of temperatures at an inner edge of the metal body and the frame.

4. The infrared sensor according to claim 1, wherein the signal processing circuitry comprises means for on-chip calibration and means for nonlinear temperature compensation responsive to changes in the temperature of the signal processing circuitry.

5. The infrared sensor according to claim 1, wherein the diaphragm has a rectangular shape with corners, the thermocouples being shortest at the corners and progressively increasing in length therebetween.

6. The infrared sensor according to claim 1, wherein substantially the entire diaphragm is occupied by either the thermopiles or a central heat-absorption zone surrounded by the thermopiles.

7. The infrared sensor according to claim 6, further comprising a metal body within the diaphragm and within the central heat-absorption zone for reflecting infrared radiation through the second dielectric layer so as to increase absorption of infrared radiation within the heat-absorption zone and thereby increase the temperature at the hot junctions of the thermopiles.

8. The infrared sensor according to claim 1, wherein the diaphragm has a rectangular shape, the infrared sensor further comprising a rectangular-shaped metal body surrounding the hot junctions of the thermocouples and between the hot and cold junctions of the thermocouples, the rectangular-shaped metal body serving to promote equalization of temperatures at an inner edge of the metal body and the frame.

9. The infrared sensor according to claim 1, wherein the diaphragm further comprises a second metal layer and a polysilicon layer, the second metal layer defining second metal conductors that interconnect the metal conductors of the first metal layer with the signal processing circuitry, the polysilicon layer defining polysilicon conductors in parallel with the second metal conductors of the second metal layer, the polysilicon and second metal conductors defining coaxial conductors that electrically interconnect the thermopiles with the signal processing circuitry.

10. The infrared sensor according to claim 1, wherein the diaphragm further comprises a third dielectric layer deposited so that the first metal layer is between the second and third dielectric layers, the third dielectric layer comprising at least one infrared-absorbing material chosen from the group consisting of an oxynitride or a tetra-ethyl-ortho-silicate based oxide.

11. The infrared sensor according to claim 10, wherein the third dielectric layer comprises a tetra-ethyl-ortho-silicate based oxide layer and an oxynitride layer, the tetra-ethyl-ortho-silicate based oxide layer being closer to the first metal layer than the oxynitride layer.

12. The infrared sensor according to claim 11, further comprising a tungsten silicide layer between the tetra-ethyl-ortho-silicate based oxide layer and the oxynitride layer, the tungsten silicide layer increasing infrared absorption within a central absorption zone of the diaphragm aligned with the hot junctions of the thermocouples.

13. The infrared sensor according to claim 1, further comprising a heater element in the diaphragm and means for applying a current to the heater element to raise the temperature of the diaphragm.

14. An infrared sensor comprising:
   a frame formed of a semiconductor material that is not heavily doped, the frame defining and surrounding a rectangular-shaped cavity;
   a rectangular-shaped diaphragm suspended by the frame over the cavity, the diaphragm having a first surface within the cavity for receiving thermal radiation and an oppositely-disposed second surface, the diaphragm comprising a first dielectric layer, a sensing layer on the first dielectric layer and defining at least a pair of interlaced thermopiles, a second dielectric layer on the sensing layer, a first metal layer defining first metal conductors that electrically contact the thermopiles through openings in the second dielectric layer, a third dielectric layer on the first metal layer, a second metal layer defining second metal conductors that electrically contact the first metal conductors through openings in the third dielectric layer, and a fourth dielectric layer on the second metal layer, each thermopile comprising a sequence of thermocouples, each thermocouple comprising dissimilar electrically-resistive materials that define hot junctions located on the diaphragm and cold junctions located on the frame, the thermocouples being shortest at corners of the diaphragm and progressively increasing in length therebetween so that substantially the entire diaphragm is occupied by either the thermopiles or a central heat-absorption zone surrounded by the hot junctions of the thermocouples;

a first metal body between the second and third dielectric layers for reflecting infrared radiation through the second dielectric layer so as to increase absorption of infrared radiation within the heat-absorption zone and thereby increase the temperature at the hot junctions of the thermocouples; and signal processing circuitry on the frame and electrically interconnected with the thermopiles through the first metal conductors defined by the first metal layer and the second metal conductors defined by the second metal layer, the thermopiles being interlaced so that the output of a first of the thermopiles increases with increasing temperature difference between the hot and cold junctions thereof, and so that the output of a second of the thermopiles decreases with increasing temperature difference between the hot and cold junctions thereof.

15. The infrared sensor according to claim 14, further comprising:

a rectangular-shaped metal body between the third and fourth dielectric layers, the rectangular-shaped metal body surrounding the hot junctions of the thermocouples and being between the hot and cold junctions of the thermocouples to promote equalization of temperatures at an inner edge of the metal body and the frame; and a tungsten silicide layer between the third and fourth dielectric layers so as to be surrounded by the rectangular-shaped metal body, the tungsten silicide layer increasing infrared absorption within the central absorption zone of the diaphragm.

16. The infrared sensor according to claim 14, wherein the signal processing circuitry comprises a serial bus interface and nonvolatile memory integrated circuit units that provide an on-chip calibration capability, and means for nonlinear temperature compensation responsive to changes in the temperature of the signal processing circuitry.

17. The infrared sensor according to claim 14, wherein the diaphragm further comprises a polysilicon layer defining polysilicon conductors in parallel with the second metal conductors of the second metal layer, the polysilicon and second metal conductors defining coaxial conductors that electrically interconnect the thermopiles with the signal processing circuitry.

18. The infrared sensor according to claim 14, wherein the third and fourth dielectric layers comprise at least one infrared-absorbing material chosen from the group consisting of an oxynitride or a tetra-ethyl-ortho-silicate based oxide.

19. The infrared sensor according to claim 14, wherein the third dielectric layer comprises a tetra-ethyl-ortho-silicate based oxide and the fourth dielectric layer comprises an oxynitride.

20. The infrared sensor according to claim 14, wherein the signal processing circuitry comprises means for sensing the temperature of the frame.

21. The infrared sensor according to claim 14, further comprising a heater element that surrounds the central heat-absorption zone 30, and means for applying a current to the heater element to raise the temperature of the central heat-absorption zone.

22. The infrared sensor according to claim 14, wherein the infrared sensor is housed within a CERDIP package.

* * * * *